(12) United States Patent
Park et al.

(10) Patent No.: US 7,805,528 B2
(45) Date of Patent: Sep. 28, 2010

(54) USER INTERFACE APPARATUS FOR CONTEXT-AWARE ENVIRONMENTS, DEVICE CONTROLLING APPARATUS AND METHOD THEREOF

(75) Inventors: Jun-Hee Park, Daejon (KR);
Young-Sung Son, Daejon (KR);
Kyeong-Deok Moon, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 854 days.

(21) Appl. No.: 11/321,851

(22) Filed: Dec. 29, 2005

(65) Prior Publication Data
US 2007/0073870 A1    Mar. 29, 2007

(30) Foreign Application Priority Data
Sep. 23, 2005   (KR) ...................... 10-2005-0088928

(51) Int. Cl.
*G06F 15/173* (2006.01)
(52) U.S. Cl. ....................... 709/229; 709/224; 709/228; 455/414.1; 455/410
(58) Field of Classification Search ................. 709/229, 709/224–228; 455/410, 414.1
See application file for complete search history.

(56) References Cited
U.S. PATENT DOCUMENTS
6,175,771 B1* 1/2001 Hunt et al. ..................... 700/3

| | | | |
|---|---|---|---|
| 7,363,028 B2* | 4/2008 | de Clerq et al. | 455/414.1 |
| 2003/0189481 A1* | 10/2003 | Hamid | 340/5.53 |
| 2003/0216139 A1* | 11/2003 | Olson et al. | 455/419 |

FOREIGN PATENT DOCUMENTS

| KR | 1020020083537 | 11/2002 |
|---|---|---|
| KR | 1020020087329 A | 11/2002 |
| KR | 10-2004-0094233 | 11/2004 |
| KR | 10-2004-0094236 | 11/2004 |
| KR | 1020050046580 | 5/2005 |
| KR | 1020060028143 A | 3/2006 |
| KR | 1020060061190 A | 6/2006 |

* cited by examiner

*Primary Examiner*—Wing F Chan
*Assistant Examiner*—Ruolei Zong
(74) *Attorney, Agent, or Firm*—Ladas & Parry LLP

(57) ABSTRACT

A user interface apparatus, a device controlling apparatus and a method thereof are disclosed. The user interface apparatus includes: a button input unit for sensing activation of a button; a wireless communication unit for transferring a control message through a wireless network to control electronic appliances; and a controlling unit for sensing a button activation pattern, creating the control message with the button activation pattern and user information, and transmitting the control message to a device controlling apparatus through the wireless communication unit to control corresponding electronic appliances according to a time/environment based user pattern.

14 Claims, 7 Drawing Sheets

FIG. 6

| USER BUTTON ID OR USER ID | TIME | SPACE | | SMART BUTTON PUSH TYPE | TARGET DEVICE |
|---|---|---|---|---|---|
| A | 07:00 ~ 07:30 | HOME | LIVING ROOM | LONG ONCE | OPEN CURTAIN --> TURN ON TV --> TURN ON COFFEE POT |
| | | | LIVING ROOM | SHORT ONCE | OPEN CURTAIN |
| | | | | SHORT TWICE | TURN ON TV |
| | | | ROOM1 | SHORT ONCE | TURN ON STAND |
| | 07:30 ~ 08:00 | CAR | | LONG ONCE | START ENGINE ' TURN ON AUDIO |
| | | | | SHORT ONCE | START ENGINE |
| | | | | SHORT TWICE | TURN ON AUDIO |
| | 08:30 ~ 09:00 | OFFICE | | LONG ONCE | TURN ON STAND --> TURN ON COMPUTER --> SET CALL-FORWARDING |
| | | | | SHORT ONCE | TURN ON STAND |
| | | | | SHORT TWICE | TURN ON COMPUTER |
| | 18:00 ~ 18:30 | OFFICE | | LONG ONCE | RELEASE CALL-FORWARDING --> TURN OFF COMPUTER --> TURN OFF STAND |
| | | | | SHORT ONCE | RELEASE CALL-FORWARDING |
| | | | | SHORT TWICE | TURN OFF COMPUTER |
| | | | | SHORT 3 TIMES | TURN OFF STAND |
| | 19:00 ~ 24:00 | HOME | LIVING ROOM | LONG ONCE | TURN ON LIVING-ROOM LIGHT --> TURN ON TV --> TURN ON HEATER --> FILL BATHTUB WITH WATER |
| | | | | SHORT ONCE | TURN ON LIVING-ROOM LIGHT |
| ... | ... | ... | | ... | ... |

USER INTERFACE APPARATUS FOR CONTEXT-AWARE ENVIRONMENTS, DEVICE CONTROLLING APPARATUS AND METHOD THEREOF

FIELD OF THE INVENTION

The present invention relates to a user interface apparatus for context-aware environments and a device controlling apparatus and a method thereof; and more particular, to a user interface apparatus for context-aware environments, a device controlling apparatus and a method thereof for conveniently transferring user's context and providing device controlling services based on the user's context in order to provide ubiquitous services at home, in a car or in an office.

DESCRIPTION OF RELATED ART

Ubiquitous environment denotes an environment allowing a user to receive various services through freely accessing an invisible communication network without aware of a computer or a network and without having locality limited. That is, the ubiquitous means an environment allowing a user to economically and conveniently exchange information at anytime, at anywhere, with any device and through any media.

A home network leading into a ubiquitous generation is an environment providing various, secured, smart and automated services to a user without being limited by time, location and device. In order to provide such services through the home network, the home network builds a communication network with audio and video (A/V) devices, data communication devices and information electronic appliances as a network at home based on wired/wireless communication network, i.e., a mobile communication network or a high-speed Internet, and centrally manages the services through a central type home server. The goal of the home network is to maximize a user's convenience through providing various services by intelligently analyzing various user's requests and environmental information.

There are many researches in progress to develop the home network suitable to ubiquitous environment that requires intelligent and dynamic computing environment. In order to achieve such an intelligent and dynamic computing environment, there is great demand of a technology for recognizing common context and exchanging the recognized context among various entities and a context-aware environment technology for providing optimized services according to given environmental situations. That is, the ubiquitous environment should be a dynamic computing environment providing 'Invisible service' to users without requiring user's awareness of computing environment such as requesting a service, accessing a network or clicking buttons.

A user interface is one of most important fields in the ubiquitous environment.

Recently, a fundamental infrastructure is provided to build a communication network with various information electronic appliances and to remotely control them through the communication network according to the rapid development of the home network. However, the home network is not actively used or a market of the home network is not revitalized because a user has many difficulties to access the user interface.

A user interface technology for controlling devices in the home network was focused at a graphic user interface of a device having a display such as a handheld phone, a personal digital assistant (PDA), a WebPad, a personal computer (PC) or a television set (TV). However, users not familiar with a computer may have many difficulties to use such devices. Although users are familiar to use those devices, it is very annoying to the user to independently control each of those devices along the GUI flow. Such a difficulty is also arisen in a car or in an office.

A context-aware technology is also one of most important technology to advance a current home network environment to ubiquitous environment.

The context-aware technology is required to discover user's intension through accurately sensing user's movements based on a sensor network to provide appropriate service that the user wants. However, it is impossible to recognize user's numerous uncertain movements through sensing in a current related technology level. Although there are many related studies in progress, such a technology is not easy to be introduced in a short period time. Such a short of current context-aware technology is an obstacle of developing the home network. Therefore, there are great demands to implement ubiquitous environment based on the context-aware technology.

As a first conventional technology for context-aware environment, a system for providing information using a dialogue type interface was introduced in Korea Patent Publication No. 2004-0094236 entitled "INFORMATION PROVIDING SYSTEM AND METHOD OF DIALOGUE TYPE INTERFACE" issued at 9 Nov., 2004. In the first conventional technology, a user's context is collected based on inputted texts using the dialogue interface, most proper services are selected and called based on the collected user's context, and the optimized information is provided to the user by converting data to be suitable to a communication channel to the user. As a second conventional technology, a method of collecting user's context was introduced in a Korea Patent Publication No. 2004-0094233, entitled "USER CONTEXT COLLECTING METHOD USING INTERACTIVE INTERFACE," issued on Nov. 9, 2004. In the second conventional technology, the user's context is collected based on texts inputted through an interactive interface, and optimized information is provided to the user through a communication channel to a client.

However, the first and the second conventional technologies are limited to a handheld phone application technology since the conventional technologies relay on a short message service function in a handheld phone. Therefore, a technology for providing ubiquitous services in various places such as home, car or office is proposed in the present invention.

Also, user's demands and intentions are analyzed based on various texts inputted by a user and corresponding services are provided to the user in the first conventional technology. On the contrary, in the present invention, user friendly services are provided through simple request signals inputted from the user. Furthermore, the conventional technologies require a module analyzing the texts inputted from the user and predicting a proper service based on the analysis result to be included in a conventional system, i.e., a handheld phone. Differently, in the present invention, a smart button and other controlling modules are divided to a portable device and servers in corresponding local areas.

In the second conventional technology, various texts inputted from the user are collected and analyzed in several processing steps to distinguish a service requested from the user. In the present invention, the user's request is easily and clearly distinguished by receiving a button activation pattern from the user, and the user friendly services are provided according to the button activation pattern. Furthermore, the second conventional technology requires an analyzer to analyze the texts inputted from the user and to determine proper service. However, the present invention predicts the user's request through simply mapping the user input to the requested service.

Therefore, the first and the second conventional technologies are not suitable to context-aware based ubiquitous service.

Most people have repeated living patterns of controlling various information electron appliances such as a light, a coffee port, a personal computer, a television set and an audio while traveling among familiar places such as home, a car, a school or an office, and a favorite restaurant. For example, Mr. Park generally turns on light, turns on TV and then fills the bathtub with hot water on everyday when he arrives at home after working. As another example, when Mrs. Kim arrives at her office, she turns on a desk lamp and a computer and sets a call forwarding function on everyday. Also, when Mrs. Kim leaves the office, she turns off the desk lamp and the computer and releases the set call forwarding function.

Therefore, there is great demand to simple user interface environment capable of easily controlling peripheral information electron appliances by transferring user's context to provide context-aware based ubiquitous service through analyzing a predetermined living pattern of a user.

SUMMARY OF THE INVENTION

It is, therefore, an object of the present invention to provide a user interface apparatus, a device controlling apparatus and a method thereof for providing context-aware based ubiquitous services by enabling a user to conveniently transfer context of environments such as home, a car and an office and providing a device control service to control corresponding devices in a predetermined environment based on the transferred context.

In accordance with an aspect of the present invention, there is provided a user interface apparatus for context-aware including: a button input unit for sensing activation of a button; a wireless communication unit for transferring a control message through a wireless network to control electronic appliances; and a controlling unit for sensing a button activation pattern, creating the control message with the button activation pattern and user information, and transmitting the control message to a device controlling apparatus through the wireless communication unit to control corresponding electronic appliances according to a time/environment based user pattern.

The user interface apparatus may further includes a biometric unit for authenticating a user through fingerprint identification when a user activates the button, wherein the controlling unit obtains authentication information of authenticated user through the biometric unit and uses the obtained authentication information as the user information.

In accordance with another aspect of the present invention, there is provided a device controlling apparatus for controlling electronic appliances within a predetermined distance including: a storing unit for storing electronic appliance control pattern per a user according to a time, an environment and a button activation pattern; a wireless communication unit for receiving a control message through a wireless network to control the electronic appliances; and a controlling unit for authenticating a corresponding user based on the user information in the control message, collecting information about a current time and a current location of the user, extracting device control information mapped to the collected time/environment information and button activation pattern information included in the control message from the storing unit, and controlling corresponding electronic appliances according to the extracted device control pattern.

The device controlling apparatus may further include a sub-environment controlling unit for differently controlling electronic appliances in sub-environment when the environment is classified into the sub-environments.

In accordance with still another aspect of the present invention, there is provided a method of controlling electronic appliances within a predetermined distance including the steps of: building an electronic appliance control pattern per a user according to a time, an environment and a button activation pattern in response to a user's request; receiving a control message through a wireless network to control the electronic appliances; authenticating a user based on user information in the control message; collecting current time information and environmental information of a user's location; extracting an electronic appliance control pattern based on the button activation pattern in the control message and the collected time and environment information; and controlling corresponding electronic appliances according to the extracted electronic appliance control pattern.

BRIEF DESCRIPTION OF THE DRAWINGS

The above and other objects and features of the present invention will become apparent from the following description of the preferred embodiments given in conjunction with the accompanying drawings, in which:

FIG. 6 exemplary shows a configuration structure of a user pattern database in accordance with a preferred embodiment of the present invention.

DETAILED DESCRIPTION OF THE INVENTION

Hereinafter, a user interface apparatus for context-aware environment, a device controlling apparatus and a method thereof will be described in more detail with reference to the accompanying drawings.

Figure 1:
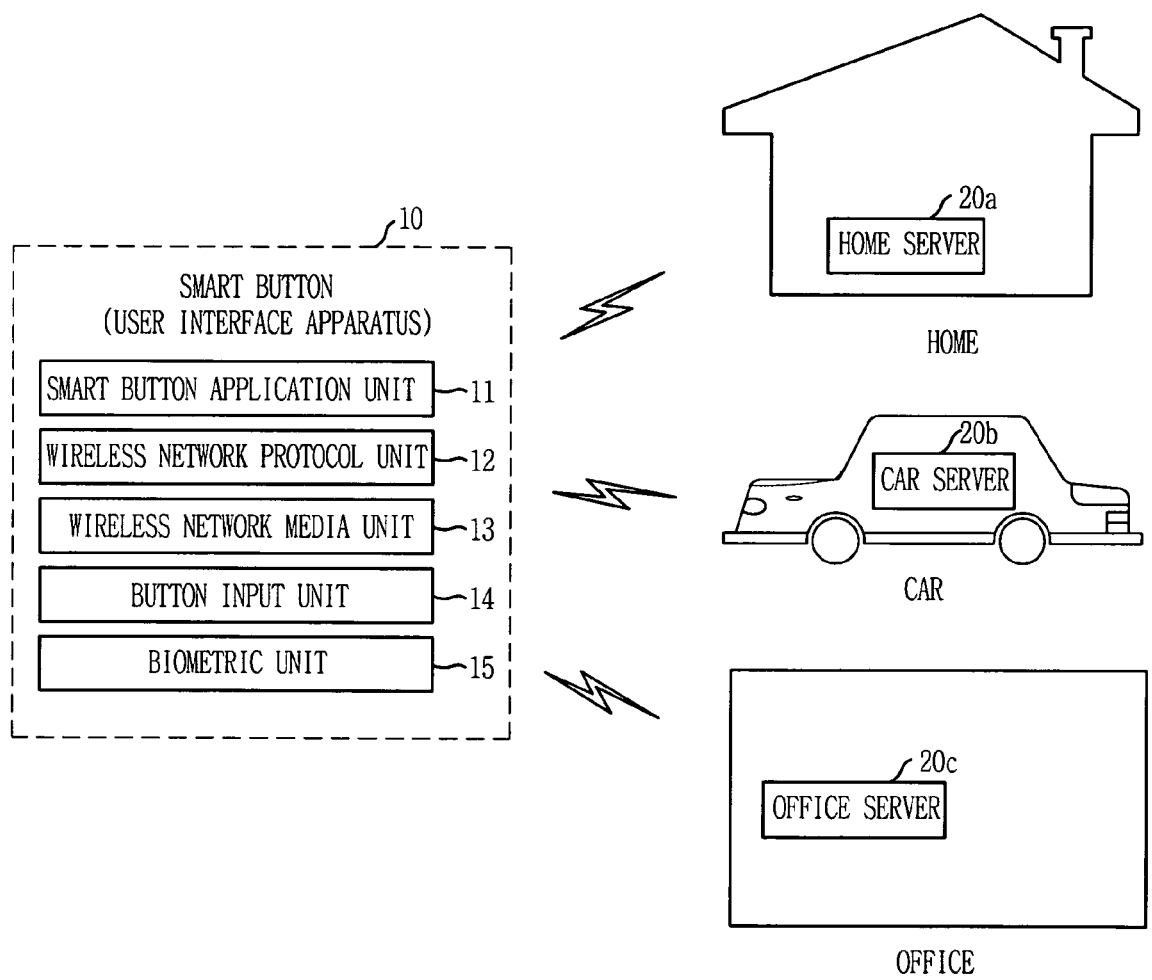
FIG. 1 is a diagram illustrating a user interface apparatus and a device controlling apparatus in accordance with a preferred embodiment of the present invention.
Figure 3:
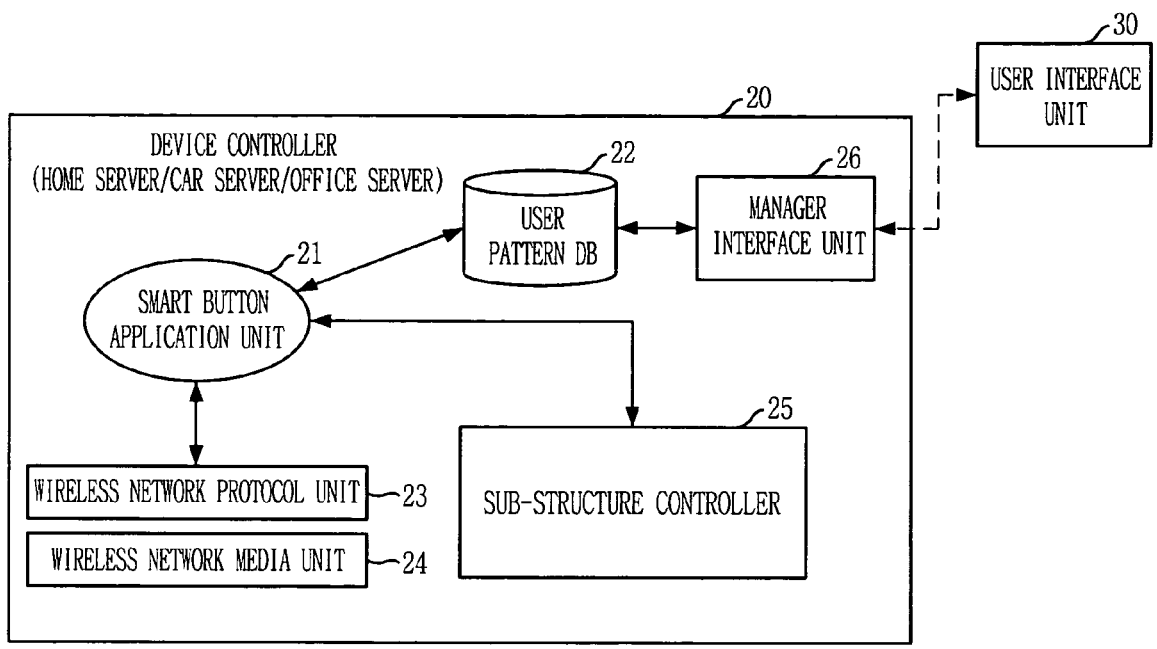
FIG. 3 is a block diagram illustrating the device controlling apparatus shown in FIG. 1.

FIG. 1 is a diagram illustrating a user interface apparatus and a device controlling apparatus in accordance with a preferred embodiment of the present invention, and FIG. 3 is a block diagram of the device controlling apparatus shown in FIG. 1.

Referring to FIGS. 1 and 3, the user interface apparatus 10 and the device controlling apparatus 20 communicate one another and cooperated together to provide context-aware based ubiquitous services to a user. The user interface apparatus 10 may be provided as a smart button and the device controlling apparatus 20 may be provides as a home host server 20A, a car host server 20B and an office server 20C.

As shown in FIG. 1, the user interface apparatus 10 such as the smart button includes a communication module configured of a wireless network media unit 13 and a wireless network protocol unit 12, and a smart button application unit 11 for transferring user's context information, i.e., button activation pattern information, when the user interface apparatus 10 is turned on, that is, when the smart button is activated by a user.

The user context information denotes a pattern of activating the user interface apparatus such as the smart button. The user context information is transferred to the device control apparatus 20 through a wireless network, i.e., wide local area network (WLAN), Bluetooth and Zigbee. Occasionally, the user context information may be transferred through an access point (AP) for transmitting the user context information through a wired network. Then, the device controlling apparatus 20, i.e., the home server 20A, the car server 20B and the office server 20C, controls corresponding information electronic appliances according to the user context information transferred from the user interface apparatus 10, i.e., the smart button.

The device controlling apparatus 20 receives the user context information from the user interface apparatus 10 and controls target information electronic appliances according to the user's request. The device controlling apparatus 20 includes a smart button application server 21, a user pattern database 22, a wireless network protocol unit 23, a wireless network media unit 24, a sub-structure controller 25 and a management interface unit 26. The user interface apparatus 10 transfers a control message having the user's context information the communication module thereof, i.e., the wireless network media unit 13 and the wireless network protocol unit 23. Then, the device controlling apparatus 20 receives the control message through the wireless network media unit 24, the wireless network protocol unit 23 and the smart button application server 21.

The smart button application server 21 searches a corresponding user's pattern in the user pattern database (DB) 22 according to information included in the control message and controls the peripheral devices according to the searched pattern. Since various environments, i.e., home, a car and an office, have different structures to be controlled, the device controlling apparatus 20 further includes a sub-structure controller 21 that communicates with the sub-structures in corresponding environments. For example, the sub-structures of the home network may be middlewares such as a UPnP, a LonWorks, a LnCP and a UHNM.

In order to store device control commands and orders of controlling corresponding electronic appliances according to the user's living patterns in the user pattern DB 22, a management user interface unit 30 is provided. The order of controlling devices according to the user's device control pattern can be inputted through the management user interface 30 at remote location separated from the management interface unit 25 of the user pattern DB 22. The management interface unit 26 and the management user interface unit 30 exchange messages one another through a network to input the order of controlling devices.

Hereinafter, the user interface apparatus 10, i.e., the smart button, will be described in detail.

The user interface apparatus 10 includes a button input unit 14 for sensing activation of buttons, a wireless communication module having a wireless network protocol unit 12 and a wireless network media unit 13 for transmitting a control message through a wireless network to control the electronic appliances, and a smart button application unit 11 for sensing button activation patterns when a user activates buttons, creating the control message with the button activation pattern information and user information such as a smart button ID or user authentication information, and transferring the created control message to the device controlling apparatus 20 such as the home server 20A, the car server 20B and the office server 20C through the wireless communication module. The user interface apparatus 10 further includes a biometric unit 15 for authenticating a user through fingerprint identification when a user activates a button. Therefore, if the user is authenticated by the biometric unit 15, the control message is created with including the user authentication information as the user information. If the user authentication is not performed, the control message includes the smart button ID instead of having the user information.

The device controlling apparatus 20 such as the home server 20A, the car server 20B and the office server 20C is cooperated with the user interface apparatus 10 such as the smart button through a wireless network such as WLAN, Bluetooth and Zigbee. The device controlling apparatus 20 builds device control pattern databases per users according to a current time, environmental information of user's location and button activation patterns, such as the user pattern DB 22. The device controlling apparatus 20 receives the control message including the smart button activation pattern information and the user information from the smart button 10, authenticates the user based on the user information in the control message, collects environmental information according to the current time and user's location, extracts device control information from the device control pattern DB, that is, the user pattern DB 22, based on the collected information such as the user's time, the environment information of the user's location and the smart button activation pattern, and controls the corresponding devices.

The environment may be classified into sub-environments. For example, a home may be classified in to a living room, a bedroom or a kitchen. The sub-environments have different device control patterns although the same button activation pattern is assigned.

Hereinafter, the device controlling apparatus 20 such as the home server 20A, the car server 20B and the office server 20C, will be described in detail. As described above, the device controlling apparatus 20 is cooperated with the user interface apparatus 10 such as the smart button through a wireless network. Such a device controlling apparatus 20 includes a user pattern database 22 for storing device control patterns per each user according to time information, environment information and button activation pattern information, wherein the device control pattern is a time/environment based device control command and an order of controlling device thereof inputted from the user through a network, a wireless communication module having the wireless network protocol unit 23 and the wireless network media unit 24 for receiving the control message through the wireless network to control devices, wherein the control message includes the button activation pattern information and the user information, and the button activation pattern information is an ID assigned differently according to the user's activation pattern, and the smart button application server 21 for authenticating a user based on the user information in the control message, collecting environmental information according to the user's current location and the current time, extracting corresponding device control pattern from the user pattern database 22 mapped to the information in the control message such as the button activation pattern information and the time and environment information, and controlling corresponding devices according to the extracted device control pattern. Also, the device controlling apparatus 20 further includes a sub-structure controller 25 for classifying the environment into sub-environments and controlling devices according to each of the sub-environments.

Figure 2A:
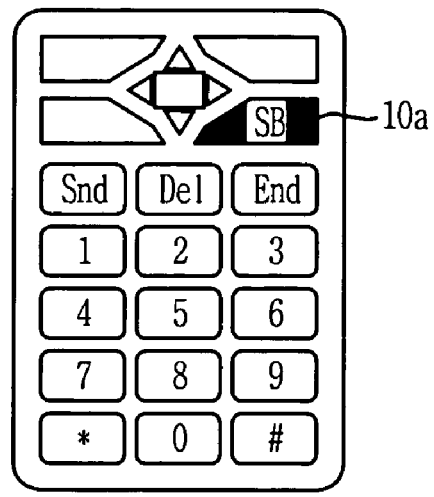
FIG. 2A to 2D show various embodiments of the user interface apparatus shown in FIG. 1.

As shown in FIG. 2A, the user interface apparatus 10 such as the smart button may be a single button 10A in a mobile communication terminal. Or, the user interface apparatus 10 may be stand-alone portable button device. For example, the smart buttons 10B, 10C and 10D may be included in a necklace, a watch or a ring as shown in FIGS. 2B through 2D.

Figure 2B:
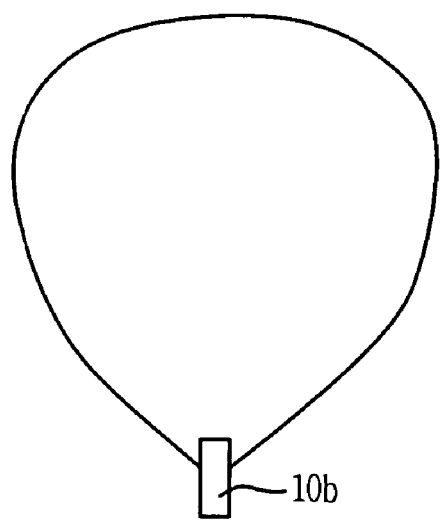
Figure 2C:
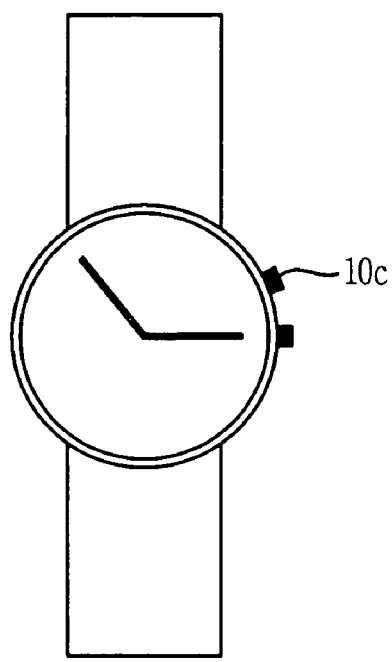
Figure 2D:
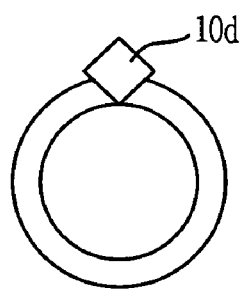

For example, a user may assign a predetermined one 10A of buttons of a mobile phone as a smart button as shown in FIG. 2A, or the smart button 10B is embedded in a pendant of a necklace 10B as shown in FIG. 2B. Also, the smart button is included in the wristwatch 10C as shown in FIG. 2C or is installed at a ring 10D as shown in FIG. 10D.

The user interface apparatus 10 such as the smart button communicates with the device controlling apparatus 20 such as the home server 20A, the car server 20B and the office server 20C through a network and transfers the user's context, i.e., the button activation pattern information, to the device controlling apparatus through the communication to control the devices according to the user's request.

Therefore, the user can control information electronic appliances according to the user's device control pattern by activating the user interface apparatus 10 such as the smart button when the user arrives at a familiar environment such as the home, the car or the office.

The user may control the devices according to time based context as well as the environmental based context through the user interface apparatus 10 such as the smart button. That is, the user can control devices according to the environments such as the home, the car and the office, and also, the user can control other devices according to the time in same environment. Therefore, target objects to be controlled varies according to the time although a user activates the smart button with same patterns. That is, the user can control difference devices in the home according to the morning and the night or in the office according to the time of arriving and the time of leaving.

For example, Mr. Park has a device control pattern such as opening a window curtain, turning on a TV and turning on a coffee port when he gets up in the morning. If Mr. Park activates the smart button 10, for example, once shortly, when he gets up in the morning, the device controlling apparatus 20 opens the window curtain. If Mr. Park activates the smart button 10 twice shortly, the device controlling apparatus 20 turns on the TV. Also, if Mr. Park activates the smart button 10 trice shortly, the device controlling apparatus 20 turns on the coffee pot. Furthermore, if Mr. Park activates the smart button 10 once long, the device controlling apparatus 20 opens the window curtain, turns on TV and turns on the coffee pot sequentially.

Also, Mr. Park has a living pattern such as turning on a light of living room, turning on TV and filling a bathtub with water when he arrives at home after work at the night. If Mr. Park actives the smart button once shortly when he arrives at home at night, the device controlling apparatus 20 turns on the light of the living room. If Mr. Park active the smart button twice shortly again, the device controlling apparatus 20 turns on TV. If Mr. Park active the smart button trice shortly again, the device controlling apparatus 20 fills the bathtub with water. Or, if Mr. Park active the smart button once long, the device controlling apparatus 20 turns on the light of the living room, turns on the TV and fills the bathtub with water sequentially.

Furthermore, if Mr. Park activates the smart button 10, for example, once shortly, when he arrives at the office, the device controlling apparatus 20 turns on a computer and a desk lamp and sets call forwarding function. However, if Mr. Park actives the smart button 10 with the same pattern, for example, once shortly, when he leaves the office at the night, the device controlling apparatus 20 turns off the computer and the desk lamp and releases the set call forwarding function.

As described above, different devices can be controlled according to the time context information through the user interface apparatus 10 such as the smart button.

If the environment is classified into sub-environments such as a living room, a bedroom and a kitchen in home, difference device control patterns may be assigned to same button activation pattern.

The user interface apparatus 10 such as the smart button provides a simple and easy interface to a user to control various devices and allows the user to transfer clear intentions of controlling desired devices to the device controlling apparatus 20.

Figure 4:
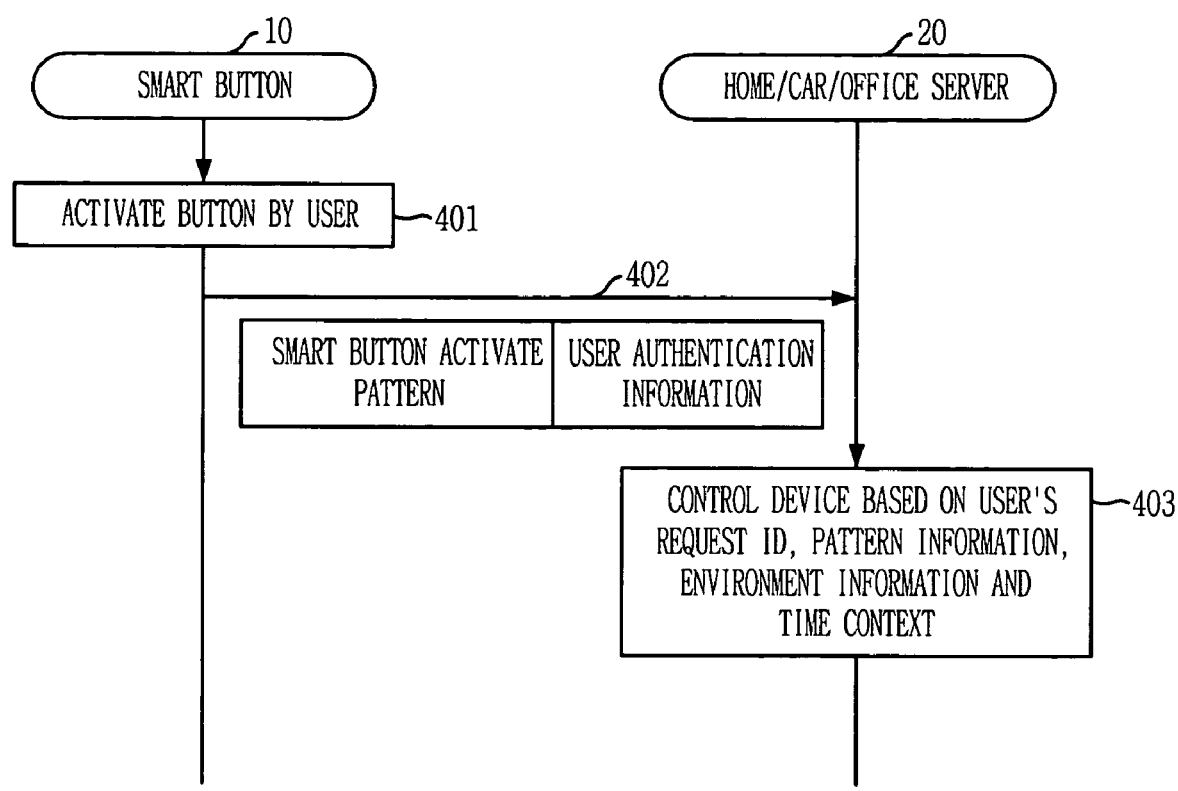
FIG. 4 is a flowchart of a method of creating a control message at a user interface apparatus and transmitting the control message from the user interface apparatus to the device controlling apparatus in accordance with a preferred embodiment of the present invention.

FIG. 4 is a flowchart showing a method of creating a control message at the user interface apparatus 10 and transferring the control message to the device controlling apparatus 20 in accordance with a preferred embodiment of the present invention.

Referring to FIG. 4, if a user in a certain environment activates the smart button 20 at the step S401, the smart button 10 creates a control message according to a pattern of activating buttons at step S402. The control message includes the button activation pattern information and the user information. The button activation pattern information is an ID assigned according to a user's pattern of activating the button, and the user information is one of a smart button ID or user authentication information authenticated by fingerprint identification such as a user ID. For example, various button activation patterns may be created by using one smart button, such as activating the smart button once shortly or long, twice shortly or long and trice shortly or long by a user.

Then, the corresponding device controlling apparatus 20 such as the home server 20A, the car server 20B and the office server 20C, analyzes context information such as user's device control pattern, current time and current location according to the transferred control message and properly controls the corresponding devices at step S403. That is, the home server 20A, the car server 20B and the office server 20C receive the control message transmitted from the smart button 10, authenticate the user based on the user information in the control message, collect environmental information according to the current time and current location of the user, extract the device control information from the user pattern DB 22 based on the information about the current time, location and button activation pattern, and control the corresponding devices according to the extracted device control information.

Figure 5:
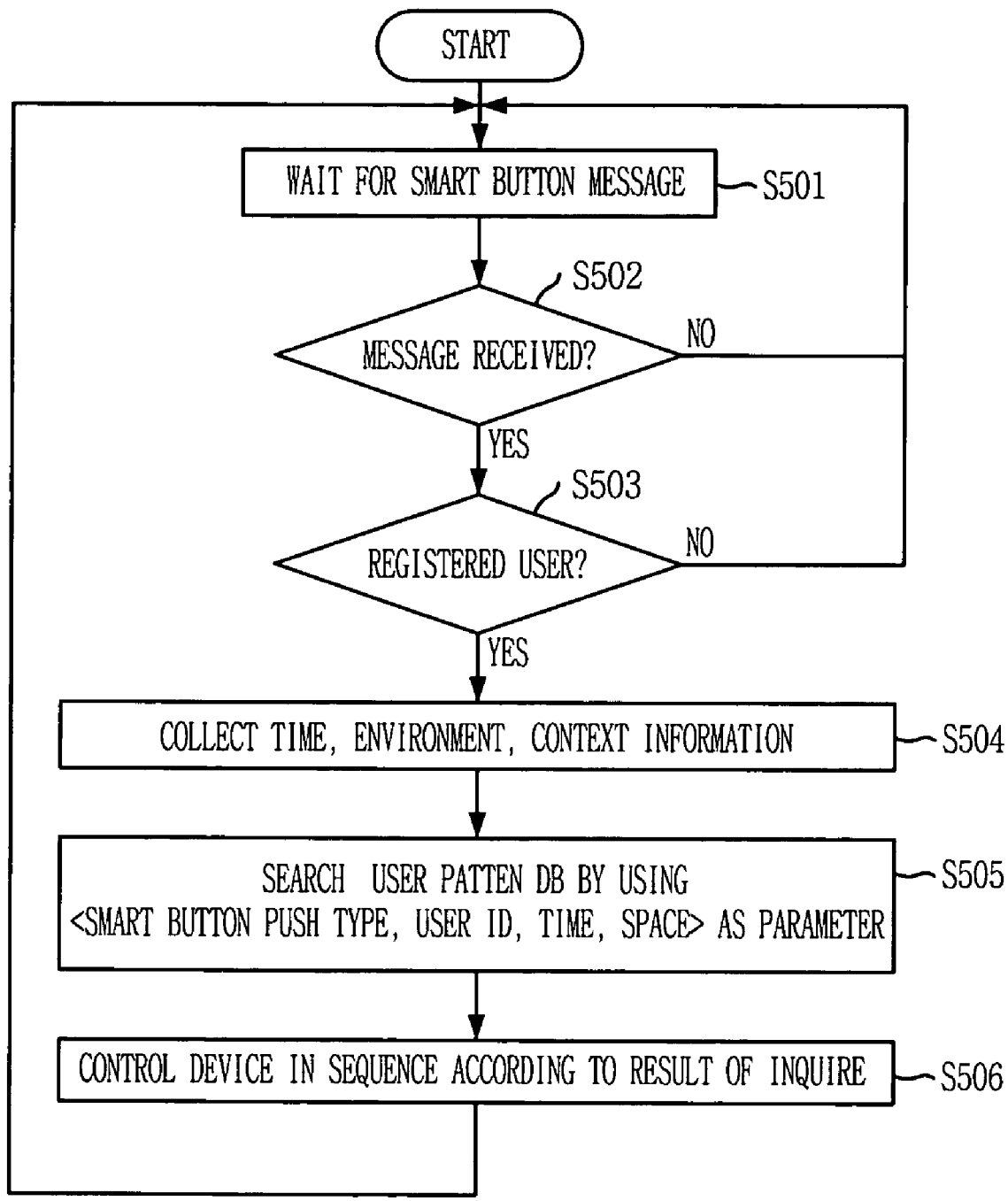
FIG. 5 is a flowchart of a method of receiving, analyzing a control message, and controlling devices in response to the control message at a device controlling apparatus in accordance with a preferred embodiment of the present invention.

FIG. 5 is a flowchart of internal operations of the device controlling apparatus 20 such as the home server 20A, the car server 20B and the office server 20C in accordance with a preferred embodiment of the present invention.

As described above, the user pattern DB 22 stores device control patterns per users according to the time, the location and the button activation pattern information. The device control pattern includes a command to control devices and an order of controlling devices according to the time and the location, which is inputted from the user through the network.

Referring to FIG. 5, the device controlling apparatus 20 such as the home server 20A, the car server 20B and the office server 20C waits for receiving a control message from the smart button 10 at step S501. When the control message is arrived at step S502, the device controlling apparatus 20 collect information about the current time and the environment information of the current location of the user at step S504, and searches the device control patterns in the user pattern DB 22 according to four parameters, user information, current time information, current location information and button activation pattern, which are included in the control message at step S505. Then, the device controlling apparatus 20 controls corresponding devices according to the searched device control pattern at step S506.

Herein, the collection of the time information may be obtained from a timer and the location information may be obtained based on a location value of the smart button 10 detected through a sensor network.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

As described above, the user interface apparatus according to the present invention transfers clear intention and request of the user to the device control apparatus through simple user's operation. Therefore, the ubiquitous service can be provided by dramatically reducing ambiguity. Also, the user interface apparatus provide a simple and easy interface to control information electronic appliances. Therefore, home network and ubiquitous services are simply and easily provided to users.

The present application contains subject matter related to Korean patent application No. 2005-0088928, filed with the Korean Intellectual Property Office on Sep. 23, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A user interface apparatus for context-aware environments, comprising:
   a button input means for sensing activation of a button;
   a wireless communication means for transferring a plurality of control messages through a wireless network to selectively control various electronic appliances; and
   a controlling means for
   sensing a button activation pattern,
   creating a first control message in response to when sensing the button activation pattern is within a first time window and in response to a first environment where the user interface apparatus is located when sending the button activation pattern,
   creating a second control message in response to when sensing the button activation pattern is within the first time window and in response a second environment where the user interface apparatus is located when sending the button activation pattern,
   creating a third control message in response to when sensing the button activation pattern is within the second time window and in response to the first environment where the user interface apparatus is located when sending the button activation pattern,
   transmitting the first control message to a first device controlling apparatus through the wireless communication means to control a corresponding first electronic appliance in the first environment in accordance to a time and environment based user pattern,
   transmitting the second control message to a second device controlling apparatus through the wireless communication means to control a corresponding second electronic appliance in the second environment in accordance to the time and environment based user pattern, and
   transmitting the third control message to the first device controlling apparatus through the wireless communication means to control a corresponding third electronic appliance in the first environment in accordance to the time and environment based user pattern.

2. The user interface apparatus as recited in claim 1, further comprising a biometric means for authenticating a user using fingerprint identification when a user activates the button, wherein the controlling means obtains authentication information from the biometric means and uses the obtained authentication information to authenticate the user.

3. The user interface apparatus as recited in claim 2,
   wherein the device controlling apparatus builds an electronic appliance control pattern database (DB) per each user in accordance to time windows, environment locations, and a button activation patterns,
   authenticates a corresponding user based on user information in the control message,
   collects information about a current time and a current location of the user,
   extracts device control information from the DB in accordance to the collected information about the current time, the current location and the sensed button activation pattern, and
   controls selectively corresponding electronic appliances using the extracted device control information from the DB based on the current time, the current location, the authenticated user, and the sensed button activation pattern.

4. The user interface apparatus as recited in claim 3, wherein the environment locations are further classified into sub-environments and the button activation pattern corresponds to controlling different device control apparatuses as a function of the sub-environments such that
   when the controlling means senses the button activation pattern is from within a first sub-environment then the controlling means creates the first control message and transmits the first control message to the first device controlling apparatus to control the first electronic appliance, and
   when the controlling means senses the button activation pattern is from within another sub-environment then the controlling means creates another control message and transmits the another control message to another device controlling apparatus to control another electronic appliance.

5. A device controlling apparatus for controlling electronic appliances within a predetermined distance, comprising:
   a storing means for storing a plurality of electronic appliance control patterns per a plurality of users in accordance to a plurality of time windows, a plurality of environments and a plurality of button activation patterns;
   a wireless communication means for transmitting a control message through a wireless network to control the electronic appliances; and
   a controlling means for
   authenticating a user based on corresponding user information in the control message,
   collecting information from within the control message about a current time and a current environmental location of the user, extracting device control information mapped to the collected time and environment information and to button activation pattern information included in the control message from correlated information stored within the storing means, controlling a first electronic appliance in accordance to the current time, to the current location and to the first button activation pattern from within the control message when the current time is at a first time and when the current location is at a first environment, and controlling another electronic appliance in accordance to the current time, to the current location and to the first button activation pattern from within the control message when the current time is at the first time and when the current location is at a second environment, controlling a different electronic appliance in accordance to the current time, to the current location and to the first button activation pattern from within the control message when the current time is at a second time and when the current location is at the first environment.

6. The device controlling apparatus as recited in claim 5, further comprising a biometric means for authenticating the users.

7. The device controlling apparatus as recited in claim 6, wherein the biometric means comprises fingerprint identification information associated with the users.

8. The device controlling apparatus as recited in claim 7, wherein the control message includes button activation pattern information and user information, the button activation pattern information is an ID assigned according to a pattern of activating a button by a user, and the user information is one of a smart button ID and authentication information of a user authenticated through fingerprint identification.

9. A method of selectively controlling various electronic appliances as a function of user, time, environment, and button activation pattern information, comprising the steps of:

building an electronic appliance control pattern database (DB) in accordance to a user, a plurality of times, a plurality of environments and a plurality of button activation patterns;

receiving a control message containing user information and a button activation pattern through a wireless network to selectively control the electronic appliances;

authenticating the user based on the user information contained in the control message by using the DB;

collecting current time information and environmental information corresponding from when and where the control message was sent;

extracting a first electronic appliance control pattern from the DB based on the current time information, the collected environmental information, the authenticated user information and the button activation pattern when the current time information corresponds to a first time window and when the collected environmental information corresponds to a first environment;

controlling a first electronic appliance using the first extracted electronic appliance control pattern;

extracting a second electronic appliance control pattern from the DB based on the current time information, the collected environmental information, the authenticated user information and the button activation pattern when the current time information corresponds to the first time window and when the collected environmental information corresponds to a second environment;

controlling a second electronic appliance using the second extracted electronic appliance control pattern; and extracting a third electronic appliance control pattern from the DB based on the current time information, the collected environmental information, the authenticated user information and the button activation pattern when the current time information corresponds to a second time window and when the collected environmental information corresponds to the first environment;

controlling a third electronic appliance using the third extracted electronic appliance control pattern.

10. The method as recited in claim 9, wherein the environment is further classified into sub-environments such that an identical button activation pattern received from different sub-environments results in controlling different electronic appliances in the different sub-environments.

11. The method as recited in claim 9, further comprising the steps of extracting a third electronic appliance control pattern from the DB based on the current time information, the collected environmental information, the authenticated user information and the button activation pattern when the current time information corresponds to the first time window and when the collected environmental information corresponds to a second environment; and controlling a third electronic appliance in the second environment using the third extracted electronic appliance control pattern.

12. The method as recited in claim 9, further comprising the steps of extracting a third electronic appliance control pattern from the DB based on the current time information, the collected environmental information, the authenticated user information and the button activation pattern when the current time information corresponds to the first time window and when the collected button activation pattern corresponds to a second button activation pattern environment; and controlling a third electronic appliance using the third extracted electronic appliance control pattern.

13. The method as recited in claim 9, further comprising building the DB in accordance to a plurality of users.

14. The method as recited in claim 13, further comprising the steps of authenticating a second user based on the user information contained in the control message by using the DB; extracting a third electronic appliance control pattern from the DB based on the current time information, the collected environmental information, the authenticated user information and the button activation pattern when the current time information corresponds to the first time window and when the authenticated user corresponds to the second user; and controlling a third electronic appliance using the third extracted electronic appliance control pattern.

* * * * *